Jan. 18, 1955
R. ARNDT
2,699,769
CROP DRIER
Filed July 5, 1950
2 Sheets-Sheet 1
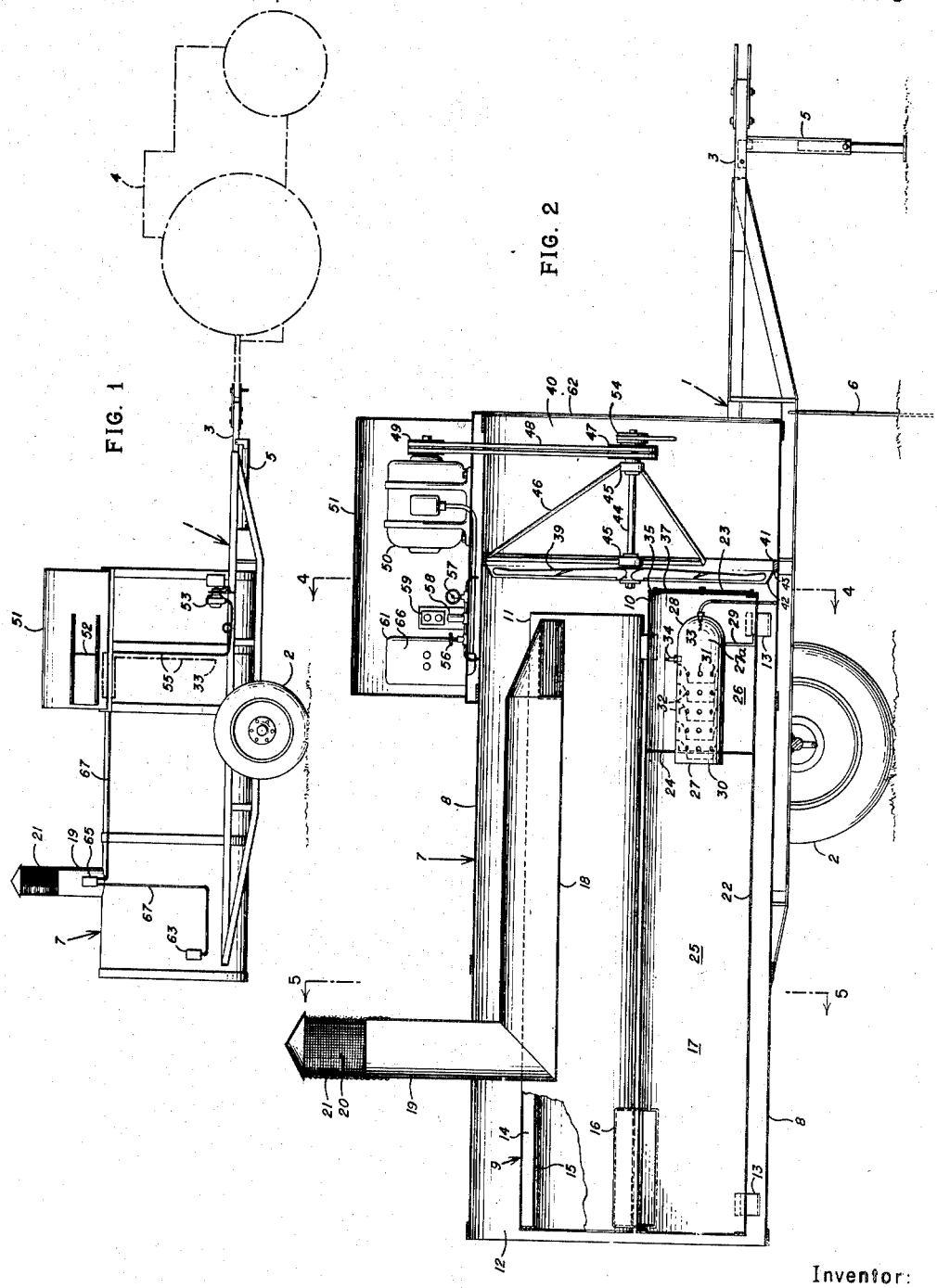
Inventor:
Raymond Arndt
By Ernest J. Mechlin
his Attorney Jan. 18, 1955

R. ARNDT 2,699,769

CROP DRIER

Filed July 5, 1950

Inventor:
Raymond Arndt
By Ernest J. Mechlin
his Attorney

United States Patent Office 2,699,769
Patented Jan. 18, 1955

2,699,769

CROP DRIER

Raymond Arndt, Columbus, Nebr., assignor to Habco Manufacturing Co., Columbus, Nebr., a corporation of Nebraska Application July 5, 1950, Serial No. 172,155

5 Claims. (Cl. 126—110)

This invention relates generally to space heaters and more particularly to driers for crops.

The primary object of the invention is to provide an improved crop drier for generating hot air and forcing such air into a space wherein a crop or the like is to be dried.

Another object of the invention is to provide an improved crop drier having a multistage heat exchanger deriving its heat from a jet burner, whereby a relatively large volume of air is efficiently heated to a desired temperature.

An additional object of the invention is to provide an improved crop drier in which both the combustion air and air to be heated are impelled by a single blower.

A further object of the invention is to provide an improved crop drier in which the temperature of the heated outlet air is readily regulated and automatically controlled.

Other objects and advantages of the invention will appear hereinafter in the detailed description, be particularly pointed out in the appended claims and illustrated in the accompanying drawings in which:

Figure 1 is a side elevational view of a preferred embodiment of the improved drier of the present invention;

Figure 2 is a side elevational view of the drier of Figure 1 on an enlarged scale, with portions broken away and shown in section to more clearly illustrate certain of the details of construction;

Figure 3:
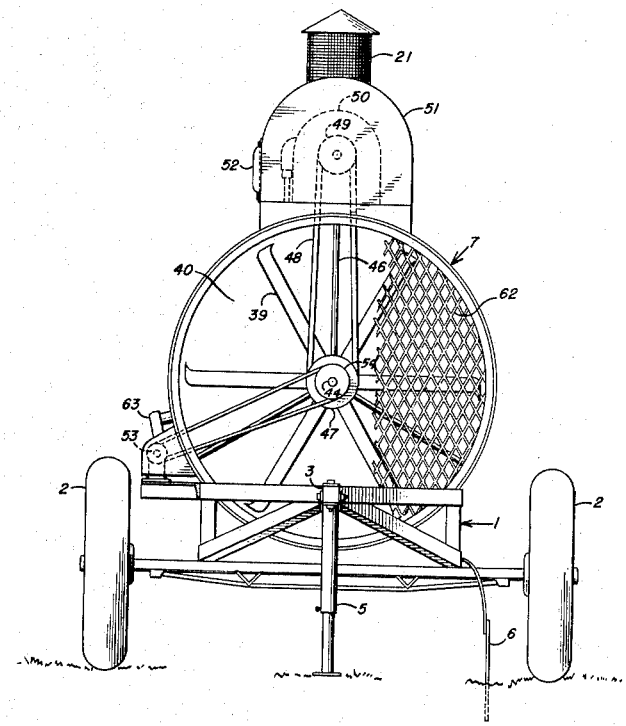
Figure 3 is a front end elevational view of the drier on the scale of Figure 2, with portions removed to more clearly illustrate certain of the details of construction.

Referring now in detail to the drawings in which like reference characters designate like parts, the improved drier of the present invention is particularly designed for drying crops and for this purpose may either be the illustrated mobile unit or adapted to be permanently mounted on a suitable base, depending upon its application. For the illustrated mobile unit, there is provided a suitable frame 1 supported on wheels 2 and having a tongue 3 for connecting it to a tractor indicated diagrammatically at 4, the tongue preferably being provided with a jack 5 for supporting the drier in level position when disengaged from its tractor. When on location, the drier normally will have its frame grounded through the jack to prevent inadvertent explosion of its fuel. However, due to the highly combustible nature of the crops which it is designed to dry, the jack is preferably supplemented by a ground rod 6 which, by being driven into the ground, ensures that a ground connection is obtained, regardless of the nature of the surface on which the jack rests.

Mounted upon the frame 1 is the body 7 of the drier which is in the form of a cylindrical casing, jacket or shell 8 of uniform cross-section and open at both ends. Within this casing is supported a heat exchanger designated generally as 9, which is comprised of a lower, primary tube, cylinder or heat exchange unit 10 and two upper, secondary tubes, cylinders or units 11, all extending axially of the casing 8 and occupying the major portion of its length, measured from the outlet end 12 of the casing. The tubes of the heat exchanger are arranged in alignment and in substantially V-shape, with the upper tubes 11 supported on the lower tube 10, the latter, in turn, being mounted within the casing on suitable feet or brackets 13. The upper of the tubes are open at both ends and hollow-walled throughout their lengths, the annular spaces 14 so provided in their walls 15 being connected by conduits 16 to the interior 17 of the lower tube 10, adjacent the outlet end 12 of the casing. Adjacent their opposite or forward ends, the annular spaces 14 are connected through a pipe 18, extending axially of the casing, to an exhaust stack 19, normal to and projecting through the casing, the stack having its outlet 20 capped and enclosed by screening 21 to prevent egress of any burning particles.

The lower tube 10 preferably is confined by a solid lateral wall 22 and its interior 17 is divided or compartmented axially toward its inner end 23 by an annular partition, spacing plate or disk 24 into a combustion chamber 25 and an air chamber 26, which occupy, respectively, the outer and inner portions of the tube. The air chamber houses or contains a jet burner 27, comprised of a housing 27a concentric with the tube and having a closed inner end 28 supported on a bracket 29 and an open outer end 30 projecting through and supported by the spacing plate 24. As shown, the burner is disposed inwardly of both the end 23 and lateral wall 22 of the tube to provide a surrounding air space within the air chamber 26, and its housing 27a has a plurality of sets of laterally arranged openings or ports 31 through which air is drawn within or inside the burner, and there directed by louvres or baffles 32 to thoroughly admix it with fuel injected into the burner through a fuel nozzle 33 in the housing. The combustible mixture so formed is ignited by suitable means, such as the illustrated spark plug 34, and exhausted or ejected into the combustion chamber 25 through the open end of the burner, wherein combustion continues until complete, the exhaust gases then being led through the conduits 16 and the hollow walls 15 of the upper tubes 11 to the exhaust stack 19, from whence they are exhausted. For regulating the volume of air admitted into the air chamber 26, the inner end of the lower tube 10 is closed by a fixed end plate 35 having one or more openings 36, on the outer face of which is pivotally mounted an adjustable shutter 37, having corresponding openings 38, by which the extent of the exposure of the openings 36 in the end plate can be varied as desired. To minimize disturbance of the air flowing therepast, the closed end 28 of the burner may, as shown, be curved or rounded.

Forced draft both of the air to be warmed for drying a crop and of the air admitted to the air chamber for combustion is obtained by a single fan or blower 39 mounted concentrically of the casing 8, intermediate the inner end of the heat exchanger and the inlet or intake end 40 of the casing, and supported in the casing by an annular ring or collar 41. The fan is contained or included longitudinally or axially of the casing within an inturned annular flange or baffle 42, which is attached or connected to the outer or discharge end 43 of the collar. Since a relatively large volume of warmed air is required for the bin, elevator or other large space in which crops are dried, the fan 39 is multibladed and of a diameter substantially equal to the inside diameter of the casing 8 for maximum draft.

Figure 4:
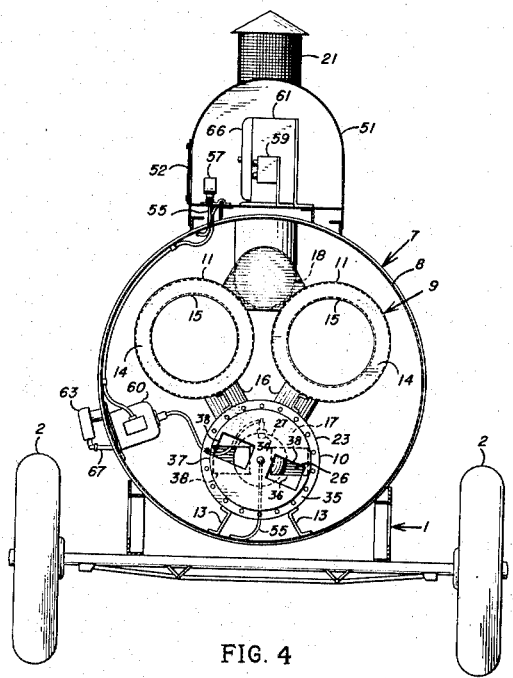
Figure 4 is a vertical sectional view, taken along the lines 4—4 of Figure 2.
Figure 5:
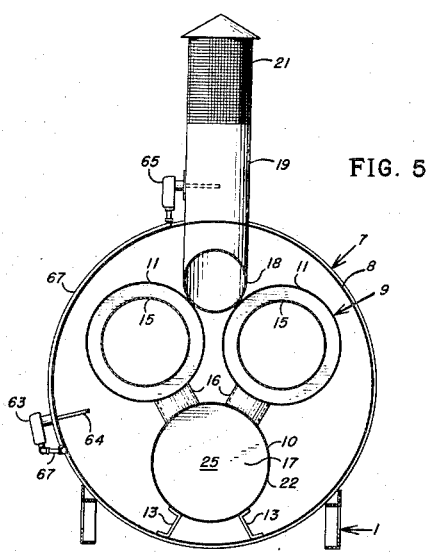
Figure 5 is a vertical sectional view, taken along the lines 5—5 of Figure 2.

The shaft 44 of the fan projects forwardly thereof and is journaled in spaced bearings 45 supported on a frame 46 carried by the collar 41. For driving the fan, there may be connected adjacent the outer end of its shaft a multisheaved pulley 47 drivably connected through V-belting 48 to a drive pulley 49 of an electric or other motor 50. The motor 50 may conveniently be housed or enclosed in a housing 51 mounted on top of the casing 8 and accessible through a sliding panel 52. As shown in Figure 4, the fan motor is utilized to drive a fuel pump 53, mounted exteriorly of the casing, through a take-off pulley 54 on the fan shaft, for supplying fuel from a suitable storage tank (not shown) to the nozzle 33 of the burner through a fuel line 55. For the illustrated position of the pump 53, the fuel line, intermediate the pump and nozzle, is looped into the housing 51 and is there provided with a hand valve 56 by which the fuel flow can be adjusted in accordance with the reading of a pressure gauge 57. Also in the fuel line within the housing is a solenoid-actuated valve 58, operated by a burner starting switch 59, the latter also being electrically connected to the spark plug or other firing device 35 through a transformer or the like 60. A separate starting switch 61 is preferably provided within the housing 51 for the motor 50, this and other controls being accessible through the aforementioned sliding panel 52.

To prevent debris from being swept or sucked into the casing by the entering air, the intake end 40 of the casing is covered by a screen 62. The drier of the present invention is also provided with means both for limiting or controlling the temperature of the outlet air and for shutting off the drier in case of flame failure. Both of the illustrated means are thermostatic controls, that 63 for limiting the air temperature being mounted on the casing adjacent its outlet end 12, and having a temperature sensitive element 64 projecting into the air stream. The other control 65 for flame failure is mounted on the stack 19. Of the two controls, the air temperature control is adapted, through suitable mechanism (not shown) which may be housed within the cover 66 of the motor-starting switch 61, to regulate the inflow of both air and fuel. The flame failure control 65 operates to shut off the drier until the cause of failure can be determined and corrected. The wiring of both controls may be led to the housing 51 through suitable conduits 67.

For illustrative purposes, the several tubes of the heat exchanger 9, around or through which the air to be warmed is driven by the fan 39, have been shown as smooth-walled. While the heat transfer so obtainable will be adequate under normal circumstances, due to the circuitous path which the exhaust gases are forced to follow before being vented, the efficiency of the heat exchanger will usually be further enhanced by finning or corrugating its lateral walls to increase the area of its heat transfer surfaces.

Warmed to the desired temperature during its passage through the heat exchanger 9, the outlet air from the drier may be funneled or directed into the bin or other space, whose contents are to be dried, by suitable tubing (not shown) which, for the illustrated mobile drier, will normally be made of canvas or other flexible material to accommodate the drier to different applications.

From the above detailed description, it will be apparent that there has been provided an improved warm air heater which is particularly adapted to dry crops and is both relatively simple in construction and efficient in operation. It should be understood that the described and disclosed embodiment is merely exemplary of the invention and that all modifications are intended to be included which do not depart either from the spirit of the invention or the scope of the appended claims.

Having described my invention, I claim:

1. A crop drier comprising a casing, a single-walled primary heat exchanger mounted in said casing, said primary exchanger being divided into an air chamber adjacent an inlet end thereof and a combustion chamber, a pair of hollow-walled secondary heat exchangers supported in superposed relation on and having the hollow interiors of their walls connected to said combustion chamber of said primary exchanger, said exchangers being arranged side-by-side longitudinally of said casing, a jet burner in and having radial entrance ports within said air chamber, said burner having an axial exhaust port within said combustion chamber, and said burner being disposed longitudinally of and spaced inwardly of and within the longitudinal and lateral confines of said primary exchanger, said air chamber having an axial opening for admitting combustion air therethrough to said inlet ports of said burner, and a fan associated with said casing for forcing air through said exchanger and said opening.

2. A crop drier comprising a casing, a single-walled primary heat exchanger mounted in said casing, said primary exchanger being divided into an air chamber adjacent an inlet end thereof and a combustion chamber, a pair of hollow-walled secondary heat exchangers supported in superposed relation on and having the hollow interiors of their walls connected to a combustion chamber in said primary exchanger, said exchangers being arranged side-by-side axially of said casing, a jet burner in and having radial entrance ports within said air chamber, said burner having an axial exhaust port within said combustion chamber, and said burner being disposed longitudinally of and spaced inwardly of and within the lateral and longitudinal confines of said primary exchanger, said air chamber having an axial opening for admitting combustion air therethrough to said inlet ports of said burner, a fan associated with said casing for forcing air through said exchanger and said opening, and a control associated with said casing for controlling the temperature of outlet air from said casing.

3. A crop drier comprising a cylindrical casing, a heat exchanger within said casing and including a tube disposed longitudinally and of lesser outside diameter than the inside diameter of said casing, means dividing said tube axially into an air chamber adjacent its inlet end and a combustion chamber, a jet burner in said air chamber and including a housing and a fuel nozzle therein, said housing having entrance ports in said air chamber and an exhaust port open to said combustion chamber and being the connection through said dividing means between said chambers, said air chamber having an axial opening for admitting air therethrough into said jet burner, means associated with said opening for regulating the supply of air to said burner, and a fan mounted in said casing for forcing air over said heat exchanger and through said opening in said air chamber.

4. A crop drier comprising a cylindrical casing, a heat exchanger within said casing and formed of a plurality of connected tubes disposed sde-by-side longitudinally of said casing, means dividing one of said tubes axially into an air chamber adjacent its inlet end and a combustion chamber, a jet burner in said air chamber and including a housing and a fuel nozzle therein, said housing having entrance ports in said air chamber and an exhaust port open to said combustion chamber and being the connection through said dividing means between said chambers, said air chamber having an axial opening for admitting air therethrough into said jet burner, means associated with said opening for regulating the supply of air to said burner, and a fan mounted concentrically of said casing for forcing air over said heat exchanger and through said opening in said air chamber.

5. A crop drier comprising a cylindrical casing, a heat exchanger within said casing and formed of connected tubes disposed side-by-side longitudinally of said casing, means dividing one of said tubes axially into an air chamber adjacent its inlet end and a combustion chamber, a jet burner in said air chamber and including a housing and a fuel nozzle therein, said housing having entrance ports in said air chamber and an exhaust port open to said combustion chamber and being the connection through said dividing means between said chambers, said air chamber having an axial opening for admitting air therethrough into said jet burner, a shutter for varying said opening and regulating the supply of air to said burner, a fan mounted concentrically of said casing for forcing air over said heat exchanger and through said opening in said air chamber, a baffle associated with said fan for deflecting said air inwardly toward said heat exchanger, and a control associated with said burner and fan for controlling therethrough the temperature of the outlet air from said casing.

References Cited in the file of this patent

UNITED STATES PATENTS

| Number | Name | Date |
|---|---|---|
| 1,757,716 | Johnson | May 6, 1930 |
| 2,058,254 | Pederson | Oct. 20, 1936 |
| 2,263,098 | Mueller | Nov. 18, 1941 |
| 2,263,732 | Johnston | Nov. 25, 1941 |
| 2,276,400 | Hubbard | Mar. 17, 1942 |
| 2,362,258 | Findley | Nov. 7, 1944 |
| 2,383,431 | Weyenberg | Aug. 21, 1945 |
| 2,469,272 | Logan | May 3, 1949 |
| 2,501,627 | Findley | Mar. 21, 1950 |
| 2,510,645 | McMahan | June 6, 1950 |